United States Patent Office 3,836,630
Patented Sept. 17, 1974

3,836,630
METHOD FOR TREATMENT OF GAS CONTAINING SULFUR DIOXIDE
Masaaki Noguchi and Hiroshi Yanagioka, Tokyo, Toshio Kanai, Yokohama, Kazuo Nishiguchi and Hideo Hashimoto, Sagamihara, Katuhiro Abe and Tomio Masuko, Yokohama, Zenichi Mashino, Kawasaki, and Yosio Kogawa, Yokohama, Japan, assignors to Chiyoda Chemical Engineering & Construction Co., Ltd., Yokohama, Japan
Filed Mar. 22, 1972, Ser. No. 237,035
Claims priority, application Japan, Mar. 29, 1971, 46/18,192; June 28, 1971, 46/47,000; Aug. 6, 1971, 46/59,391
Int. Cl. C01b 17/00
U.S. Cl. 423—242         7 Claims

ABSTRACT OF THE DISCLOSURE

A gas containing sulfur dioxide is treated in the sulfurous acid-absorbing process to have the sulfur dioxide present in the gas absorbed by dilute sulfuric acid and then the solution containing the absorbed sulfur dioxide is treated in the oxidizing process under conditions suitable for the oxidation of sulfurous anhydride. The sulfur dioxide contained in the gas can be removed substantially completely by thus allowing the $SO_2$ absorption and the $SO_2$ oxidation to be accomplished under respectively suitable conditions in separate processes. The gas can be treated advantageously without requiring the waste water to be discharged out of the system when part of the formed sulfuric acid is used as the absorbent liquid in the absorbing process, the remaining portion of sulfuric acid is used for reaction with a calcium-containing alkali solution to produce harmless gypsum, and the mother liquid is recycled for use as the wash liquid or absorbent liquid for the gas.

DETAILED DESCRIPTION OF THE INVENTION

This invention relates to a method of the treatment of a gas containing sulfur dioxide.

The sulfur dioxide present in the flue gas from large boilers is one of the major causes for air pollution. Thus, development of a technique which provides effective removal of this toxic gas from the flue gas is keenly desired at the present time. For the purpose of desulfurizing such gas, various methods have been heretofore suggested and put into practice.

One of these methods consists in washing the flue gas with sea water. By this method, the sea water which has been used in the treatment is discarded into a river or the sea. The method, therefore, only transfers the outlet for the removed sulfur dioxide from the atmosphere to the sea so that the absolute amount of sulfur dioxide discharged remains the same. In this sense, this method gives no fundamental solution to the problem.

In addition to sulfur dioxide, the flue gas from an ordinary combustion furnace contains solid matters such as soot and ashes and organic substances such as unburnt hydrocarbons and tars in the form of dust. Even if the waste water from the treatment of such smoke is passed through a filter or some other screening means, it still entrains part of the sulfur dioxide and a portion of the ashes in their dissolved state. The waste water in such a state cannot readily be deprived of the dissolved substances. If this waste water is discarded in its unaltered form, therefore, it will give rise to the problem of water pollution.

Generally, excess oxygen is present in the flue gas. With consideration of such excess oxygen, there has been suggested a method wherein the gas containing sulfur dioxide is blown into an aqueous solution containing a catalyst of $Mn^{++}$ so that the sulfur dioxide will be oxidized into dilute sulfuric acid therein (U.S. Pat. No. 2,342,704). Since the velocity with which oxygen is dissolved in the aqueous solution is remarkably small compared with the velocity of dissolution of sulfur dioxide, this method finds it difficult to oxidize the sulfur dioxide in one same device by using only the oxygen contained in the gas. Much less is it feasible to obtain complete oxidation of the sulfur dioxide by supplying extra oxygen into the gas so as to increase the dissolving velocity of oxygen to the same degree as that of sulfur dioxide. Of course, complete oxidation by the supply of extra oxygen could be accomplished, but only if there was employed an extremely large absorbing device or oxidizing device in total disregard for the economy of operation. The other defect of this method which is of fatal nature is the fact that the conventional oxidizing catalyst has its activity gradually degraded or suddenly lost and, consequently, the oxidizing activity of the catalyst cannot be retained effectively and stably over a long period of time even if the gas is subjected to a treatment prior to contact with the catalyst. Particularly when perfect treatment is required simultaneously with the flue gas treatment process of the waste liquid which originates in the treatment of the dust of the flue gas and consequently contains vanadium, nickel and other similar heavy metals considered to poison the catalyst together with readily oxidizable substances, it is imperative that the activity of the catalyst should be retained stably and the catalyst should be capable of easy activation.

It is the main object of this invention to provide a method for the treatment of gas wherein effective treatment is given not merely to the gas of the kind containing sulfur dioxide but also to the flue gas which emanates from boilers and consequently contains such catalyst-poisoning substances as soot and dust, without requiring the waste liquor to be discharge out of the system.

It is another object of the present invention to provide a method wherein the treatment of the gas is carried out while the oxidizing catalyst is subjected, in the course of oxidation of the sulfur dioxide, to activation so that the activity of the catalyst is maintained above a sufficient level.

Other objects and other characteristic features of this invention will become apaprent from the further description given in detail hereinafter with reference to the attached drawings.

FIG. 4 through FIG. 7, incl., are flow sheets illustrating other working examples of the method of this invention.

Figure 8:
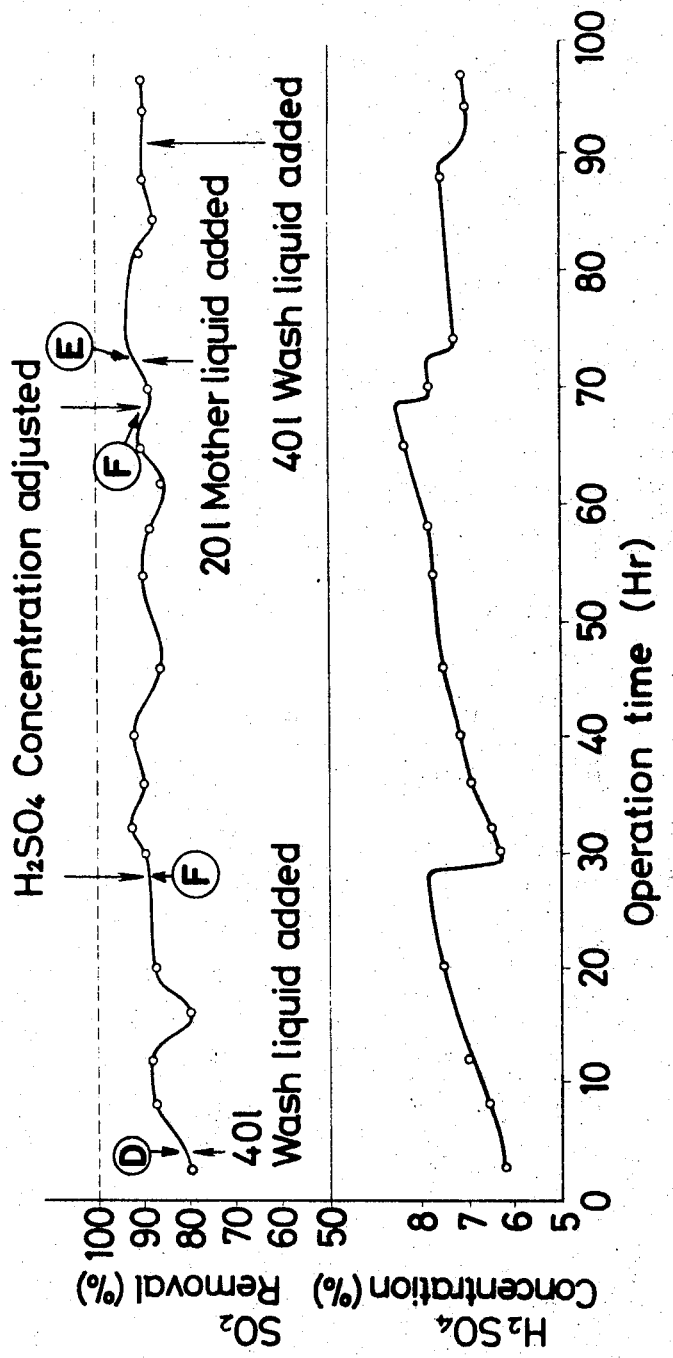

FIG. 8 is a graph showing the change of the percentage of sulfur dioxide removal and that of sulfuric acid concentration with the lapse of operation time determined in an operation carried out by the method of this invention.

To accomplish the direct oxidation of sulfur dioxide with oxygen on a large commercial scale, the first requirement is to create the optimum conditions for the absorption of oxygen. For the removal of sulfur dioxide from the gas, the pressure drop in the main current of the gas is desired to be as small as permissible. It is also necessary that the catalyst used in this treatment should be capable of retaining its activity for a long time. In the light of the preceding state of affairs, this invention adopts two separate processes, i.e., a sulfur dioxide absorbing process wherein the sulfur dioxide present in the gas is absorbed by the absorbent liquid to purify the gas and an oxidizing process in which the solution now containing the absorbed sulfur dioxide is subjected to oxidation in the presence of an oxidizing catalyst. In the oxidizing process, the solution which has absorbed sulfur dioxide is induced to absorb air or oxygen under conditions suitable for oxidation. Part of the aqueous solution of sulfuric acid produced in consequence of the oxidation is circulated to the sulfur dioxide absorbing process.

Thus, the absorption of sulfur dioxide and the absorption of oxygen are carried out separately under respectively suitable conditions in the present invention. The method of this invention, therefore, can treat a large volume of gas containing a relatively small amount of sulfur dioxide, with the pressure drop in the gas flow limited to a very small extent. The oxygen concentration in the ordinary flue gas is smaller than the oxygen concentration in the air. When air or oxygen is used for the oxidation of sulfur dioxide, the partial pressure of oxygen is increased and the velocity of oxygen dissolution is heightened in the oxidizing process. Consequently, use of air or oxygen results in ample supply of dissolved oxygen required for the intended oxidation in this process.

The amount of air or oxygen to be blown in for this purpose is strikingly small compared with the amount of waste gas being treated. Therefore, the pressure drop necessary for the absorption of oxygen will not produce any appreciable effect on equipment cost, operating cost, etc.

Figure 1:
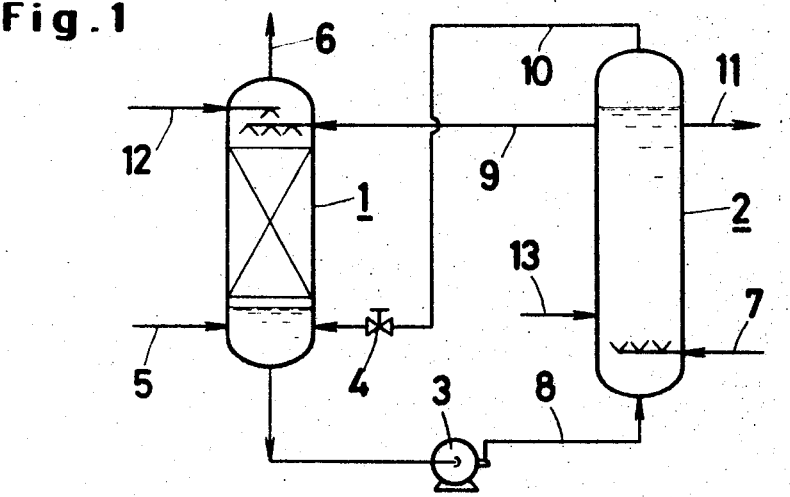
FIG. 1 is a flow sheet illustrating one working example of the method of this invention for the treatment of gas.

Referring to FIG. 1, the gas containing sulfur dioxide is introduced via a pipe 5 into the lower section of a sulfur dioxide aborbing column 1, wherein the gas is brought into counterflow contact with dilute sulfuric acid (40% by weight or below) which has overflowed a sulfur dioxide oxidizing column 2 and run through a pipe 9. Here, the sulfur dioxide present in the gas is absorbed by the dilute sulfuric acid and the gas which is now in a purified state is discharged via a pipe 6. The solution which has absorbed sulfur dioxide is forwarded by a pump 3 via a pipe 8 to the sulfur dioxide oxidizing column 2.

In the meantime, air or oxygen is fed via a pipe 7 and a solution containing an oxidizing catalyst is forwarded via a pipe 13 into the sulfur dioxide oxidizing column 2, wherein they are brought into contact with the solution forwarded from the sulfur dioxide absorbing column 1 to effect the oxidation of sulfur dioxide contained in the solution. Part of the sulfuric acid formed in the sulfur dioxide oxidizing column 2 is forwarded via the pipe 9 into the absorbing column 1 and used therein as absorbent solution for sulfur dioxide. Water is fed via a pipe 12 to keep the solution of the system in balance. At times, the gas discharged from the oxidizing column 2 contains the sulfur dioxide which has stripped off from the oxidizing column 2. This discharged gas, however, is returned via a pipe 10 back to the absorbing column 1, wherein the stripped sulfur dioxide is completely absorbed by the dilute sulfuric acid. Thus, there is no possibility that sulfur dioxide will escape out of the system. If the gas discharged from the oxidizing column 2 is perfectly free from sulfur dioxide, then it need not be returned into the atmosphere. The volume of the gas which is forwarded from the oxidizing column 2 to the absorbing column 1 is regulated by means of a valve 4. This valve 4 is used for increasing the pressure inside the oxidizing column 2 so as to increase the velocity of oxygen absorption. Depending on the performance of the oxidizing column 2, however, this pressure increase is not always found necessary.

Part of the absorbed sulfur dioxide is oxidized in the absorbing column 1, because this column receives supply of the solution which contains the oxidizing catalyst and is forwarded via the pipe 9. The proportion of sulfur dioxide which undergoes oxidization in this column is small compared with the whole sulfur dioxide that is to be oxidized. Even if this oxidation occurs in the absorbing column 1, it does not depart from the object of this invention. The desired types of the absorbing column 1 include those of packed column, spray column and plate column. Desirably, the oxidizing column 2 is of a bubbling type. For the delivery of air thereto, there may be disposed only one air inlet or two or more air inlets.

The types of these columns are not necessarily limited to those mentioned above. Any combination of two column types may suffice so far as the two types selected provide optimum performance for the absorption of sulfur dioxide and that of oxygen.

The sulfuric acid formed in the oxidizing column 2 is withdrawn via a pipe 11 and may be processed as a final product.

It may also be forwarded to a separate process to be described afterwards, wherein it is used as the raw material for the production of gypsum.

As mentioned above, the absorption of the sulfur dioxide and the oxidation of the solution which has absorbed the sulfur dioxide are effected in two separate processes according to this invention. Since these processes can be carried out under respectively suitable conditions, the sulfur dioxide can be effectively oxidized and, at the same time, the activity of the oxidizing catalyst supplied via the pipe 7 can be maintained above a sufficient level. According to the method of this invention, even if the activity of catalyst is degraded to some extent by contact with the flue gas within the absorbing column 1, the catalyst upon arrival in the oxidizing column is brought into intimate contact with oxygen of high concentration and, consequently, regains its activity. That is to say, the oxidizing column functions to cause the oxidation of sulfur dioxide and, at the same time, to activate the oxidizing catalyst. This function of catalyst activation is particularly conspicuous in the operation using $Fe^{+++}$ as the catalyst. If a divalent iron ion (which lacks catalytic activity) such as of $FeSO_4$ is added at first, the iron ion is gradually converted into the trivalent iron ion within the oxidizing column and, in the converted form, functions as any ordinary $Fe^{+++}$ catalyst.

Based on the knowledge that the catalyst activation occurs particularly conspicuously with the $Fe^{+++}$ catalyst, the inventors pursued research on $Fe^{+++}$ catalysts. Consequently, they have discovered that at temperatures over a certain level, the $Fe^{+++}$ catalyst manifests activity as great as that of the $Mn^{++}$ catalyst and that the $Fe^{+++}$ is not poisoned while $Mn^{++}$ is susceptible to catalyst poisoning.

Figure 2:
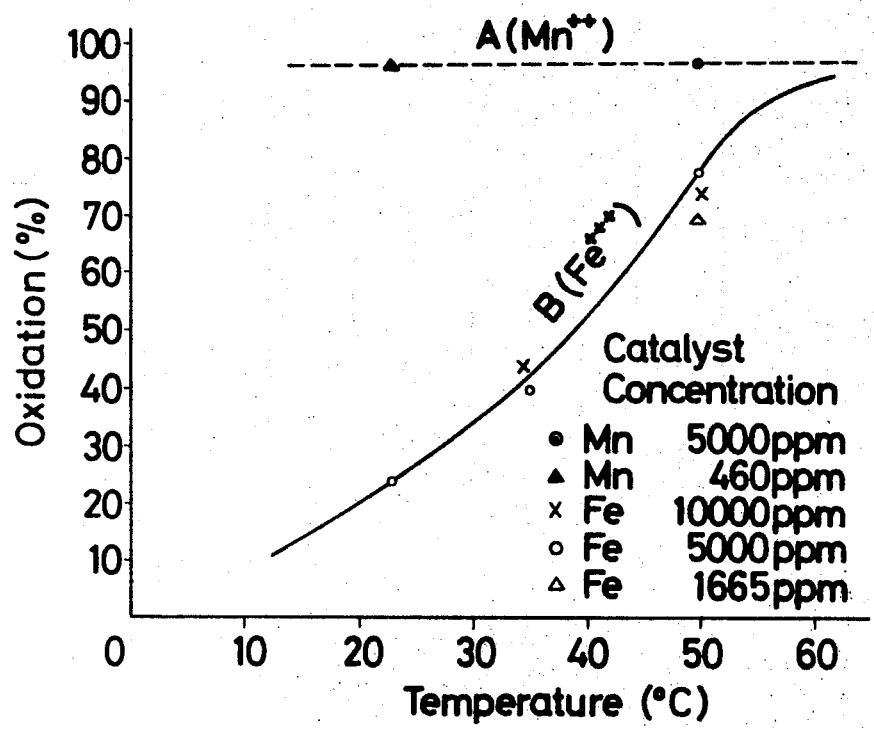
FIG. 2 is a graph showing the relationship between temperature and percentage of oxidation determined in the oxidation of sulfur dioxide using $Mn^{++}$ and $Fe^{++}$ as catalysts.

FIG. 2 is a graph showing the relationship between temperature and percentage of oxidation determined in the oxidation of sulfur dioxide using $Mn^{++}$ and $Fe^{+++}$ as catalysts. In this oxidation, an acid solution having sulfur dioxide dissolved in 5(weight)% sulfuric acid solution was fed and air was blown each at a constant flow rate into the oxidizing column, with the solution temperature and the catalyst concentration varied in the indicated ranges, to determine the oxidation percentage of sulfur dioxide. In this graph, Curve A represents the results obtained in the case of $Mn^{++}$ catalyst and Curve B those obtained in the case of $Fe^{+++}$ catalyst respectively. From the graph it is found that in the case of $Mn^{++}$ catalyst, the oxidation percentage was affected very little by the temperature and remained at substantially the same level throughout the whole range of temperatures used, while in the case of $Fe^{+++}$ catalyst, the oxidation ratio increased with the rise of temperature and, at 40° C., reached 50%, a value falling in the practical range of oxidation. When the temperature rises above 95° C., however, the oxygen in the air blown into the oxidizing column can no longer be absorbed by the solution so easily as when the temperature is lower. Therefore, the temperatures suitable for the present method range from about 40 to 95° C., preferably from 50 to 70° C. As to the concentration of $Fe^{+++}$, FIG. 2 indicates that the percentage of oxidation was practically the same when the oxidation was performed, at 50° C. by using the $Fe^{++}$ catalyst at different concentrations of 1650 p.p.m., 5000 p.p.m. and 10,000 p.p.m. The concentration is only required to fall within the range in which the oxidation can actually be accomplished effectively. Below the concentration of 0.08% by weight, the catalyst hardly produces any effect. An excess concentration above 0.6% by weight does not bring forth any increase in the catalytic effect. The preferable $Fe^{+++}$ concentration generally is in the range of from 0.1 to 0.25% by weight.

Figure 3:
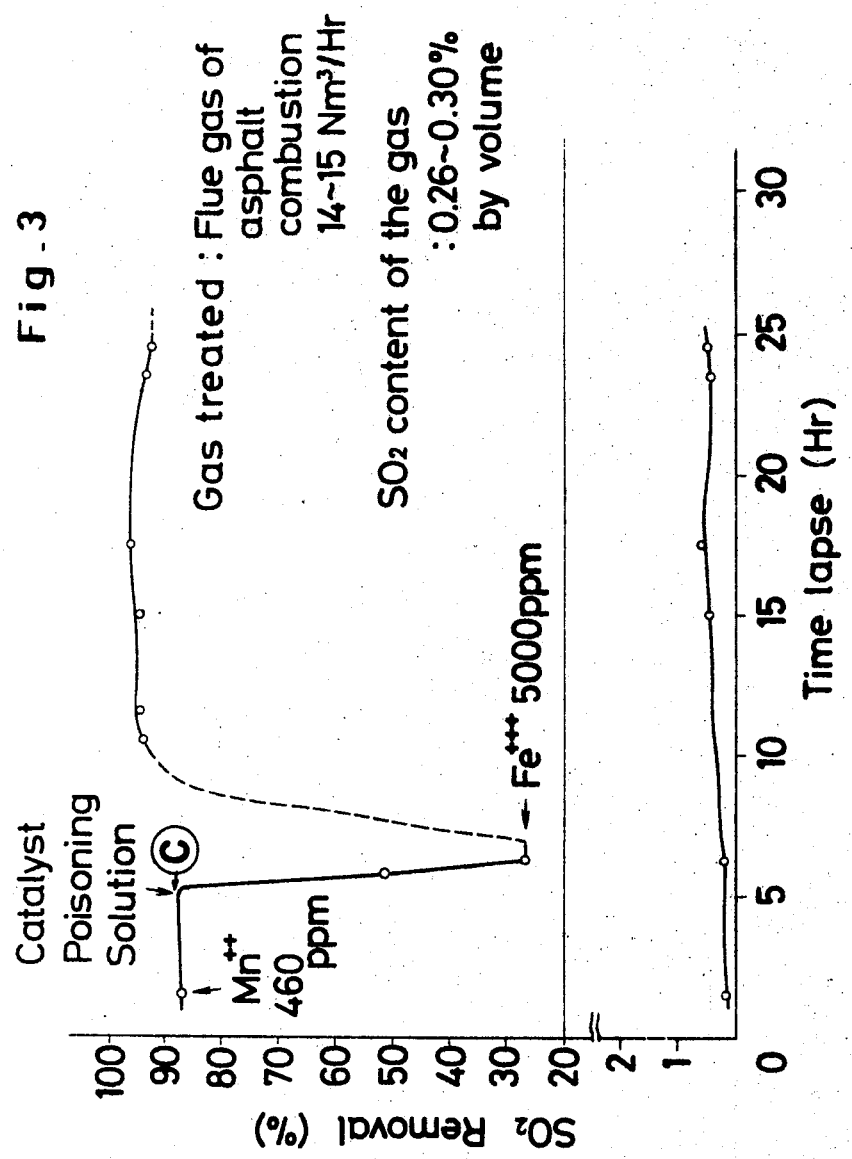
FIG. 3 is a graph showing the relationship between percentage of sulfur dioxide removal and time determined in an experiment wherein $Fe^{+++}$ was incorporated after the $Mn^{++}$ catalyst had its activity lowered.

FIG. 3 is a graph indicating that the $Fe^{+++}$ catalyst exhibited strong resistance to poisoning. In the experiment, the solution was obtained by water-scrubbing a flue gas of asphalt combustion which is considered to poison catalysts most seriously. The resultant solution was concentrated and added at the age of 5 hours of operation into a device point C in FIG. 3 wherein the absorption and oxidation of sulfur dioxide from the water-scrubbing flue gas of asphalt combustion were effected at about 50° C. by using 460 p.p.m. of $Mn^{++}$ catalyst. The percentage of sulfur dioxide removal fell immediately from about 85% to about 25%. The ratio of removal was brought back to the former level when 5000 p.p.m. of the $Fe^{+++}$ catalyst was subsequently added. The results of this operation were better than when the operation was conducted by using the $Mn^{++}$ catalyst alone. FIG. 3 clearly suggests that the $Fe^{+++}$ catalyst, unlike the $Mn^{++}$ catalyst, remains unpoisoned by the impurities present in the flue gas, such as $V_2O_5$, $NO_2$ and organic and inorganic oxidizable substances and that it has activity equal to that of the $Mn^{++}$ catalyst at the elevated temperatures indicated above.

It follows as a consequence that $Fe^{+++}$ does not exert any adverse effect upon $Mn^{++}$. To have the desired catalytic activity retained in a wider range of temperatures, therefore, it is advantageous to use $Fe^{+++}$ and $Mn^{++}$ together in the form of a compound catalyst. In this compound catalyst, the respective concentrations of the components may be determined in accordance with the gas temperature and the amount and kind of impurities involved. In the treatment of a waste gas from a sulfur recovery system, for example, the percentage of oxidation can be retained at substantially the same level in the gas temperature range of from 30 to 80° C. by using 1200 p.p.m. or more of $Fe^{+++}$ and 60 p.p.m. or more of $Mn^{++}$.

When air is used in the oxidizing column 2, it is desirable for the amount of air to be two to five times as great as the theoretical requirement. The amount of air may be slightly in excess of the equivalent weight where the oxidizing column in use excels in absorption efficiency.

Another advantage of this invention resides in the fact that the absorbing column need not be operated strictly for the sole purpose of the absorption of sulfur dioxide. In other words, part of sulfur dioxide may be oxidized in the absorbing column. The aqueous solution of sulfuric acid which has been circulated from the oxidizing column contains the oxidizing catalyst. If any oxygen has already been absorbed in the absorbing column, then the oxidation of sulfur dioxide occurs in proportion to the amount of absorbed oxygen. In this sense, the gas which contains oxygen in addition to sulfur dioxide proves to be particularly advantageous. If excess air is fed to the oxidizing column, the excess oxygen is forwarded from the oxidizing column to the absorbing column, in which it is consumed in the oxidation of sulfur dioxide. Consequently, the excess oxygen serves to lessen the load of the oxidizing column in proportion to its amount.

The flue gas from a boiler generally has a temperature in the range of from 130 to 170° C. When this flue gas is treated by the method of this invention, the gas is first introduced into the absorbing column, wherein it comes into contact with the absorbent liquid and consequently has its temperature sharply lowered. In the meantime, the water present in the absorbent liquid is vaporized because of the heat from the gas. The water continues to be vaporized into the gas until the gas is substantially completely saturated with the steam. Consequently, the gas which is discharged from the absorbing column generally has a temperature in the range of from 50 to 70° C., although it is variable with the gas temperature at the inlet of the column, the composition of the gas, the particular moisture content in the gas, and the mass and heat transfer performance of the absorbing column. Accordingly, the solution which has absorbed sulfur dioxide and which is now forwarded to the oxidizing column is brought to a temperature suitable for the use of $Fe^{+++}$ as the catalyst. Therefore, the flue gas from the boiler or some other combustion furnace can be treated without requiring the gas to be cooled or heated by any external source. In the case of a gas having a low temperature, the absorption of sulfur dioxide can be effected advantageously in a low temperature range and the subsequent oxidation of sulfur dioxide can be carried out after the temperature of the absorbent liquid has been raised as required. In treating a gas which is defiled with soot and dust, a preliminary washing column designed for removal of soot and dust may be installed where the gas is en route to the absorbing column of the present invention.

Figure 4:
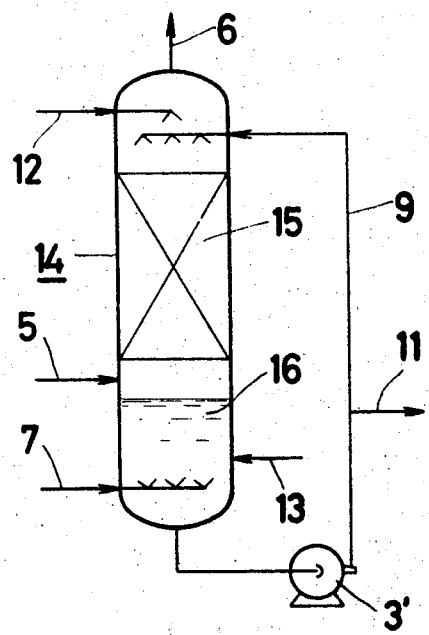

FIG. 4 is a flow sheet illustrating a device combining in a unified form the absorbing column and the oxidizing column of the preferred embodiment shown in FIG. 1.

The gas containing sulfur dioxide is fed through a pipe 5 into the middle section of the absorbing-oxidizing column 14. In the absorbing compartment 15, the gas is brought into contact with dilute sulfuric acid which has flowed down from the upper portion of the column 1 so as to have the sulfur dioxide present in the gas absorbed by the acid. The purified gas obtained after this treatment is discharged out of the system via a pipe 6. The dilute sulfuric acid which has absorbed sulfur dioxide flows down into a oxidizing compartment 16, wherein it comes into contact with oxygen or air being delivered therein via a pipe 7, with the result that the absorbed sulfur dioxide is oxidized in the presence of a catalyst introduced therein via the pipe 13. The formed sulfuric acid is withdrawn as a product via a pipe 11, while part of it is forwarded via a pipe 9 to the absorbing compartment 15 and used therein as the absorbent liquid for sulfur dioxide. The sulfur dioxide stripped in the oxidizing compartment 16 by virtue of the air is again absorbed by the dilute sulfuric acid in the absorbing compartment 15. Thus, oxidation of sulfur dioxide can be accomplished to perfection. The oxidizing catalyst which is fed via a pipe 13 functions in much the same way as in the working example of FIG. 1. The catalyst, upon degradation of activity, is activated with oxygen inside the oxidizing compartment by entirely the same principle. Although the column is of a unified construction, the sulfur dioxide absorbing process and the oxidizing process are separated and, therefore, can treat the gas under respectively optimum conditions. This embodiment of the invention proves particularly advantageous where the available floor space is small.

Figure 5:
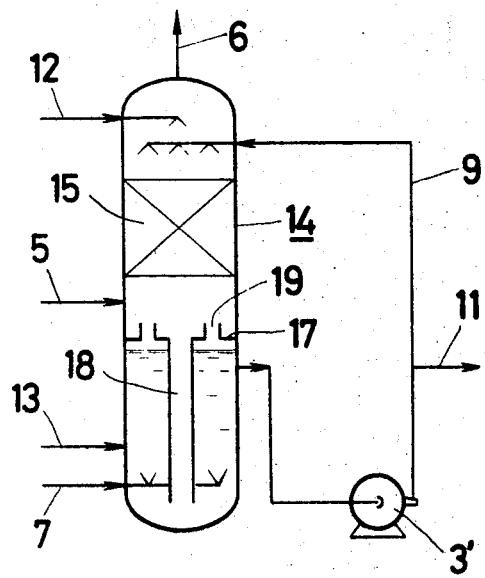

The flow sheet of FIG. 5 illustrates an embodiment having the oxidizing compartment of the device of FIG. 4 partially modified. The absorbing-oxidizing column 14 is divided into a sulfur dioxide absorbing compartment 15 and a sulfur dioxide oxidizing compartment 16 by disposing a seal pan 17 which is provided at the base with a pipe. The dilute sulfuric acid which has absorbed sulfur dioxide within the absorbing compartment 15 runs down a passage 18 into the lower portion of the oxidizing compartment 16, wherein it comes into contact with oxygen or air being delivered therein via a pipe 7 so that the sulfur dioxide is oxidized therewith. Any excess gas in the oxidizing compartment 16 is permitted to enter the absorbing compartment through gas risers 19 formed across the seal pan 17. Thus, the seal pan provides separate passages for the gas and the liquid to establish concurrent flow between the two states of fluid in the oxidizer. Consequently, the present embodiment has entirely the same function as that of the device of FIG. 1 which has the absorbing column and the oxidizing column as separately constructed units.

Figure 6:
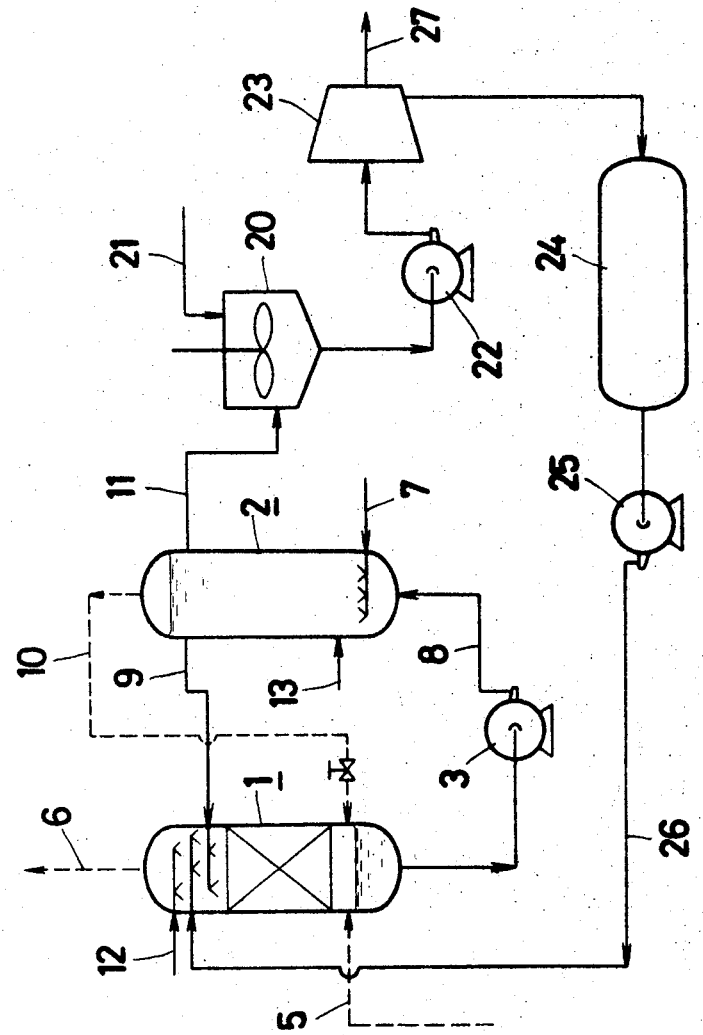

FIG. 6 is a flow sheet depicting a method for producing gypsum by using the sulfuric acid to be formed in the oxidizing column 2, to cite an example of the utilization of by-produced sulfuric acid. Referring to the diagram, the gas fed via a pipe 5 into the absorbing column 1 comes into counter-current contact with the dilute sulfuric acid which runs down from the upper section of the column 1, so that the sulfur dioxide contained therein is absorbed by the acid. The gas thus purified by the removal of sulfur dioxide is discharged out of the system via a pipe 6. The liquid which has absorbed the sulfur dioxide is forwarded by a pump to the oxidizing column 2, wherein it comes into contact with oxygen or air being delivered therein through a pipe 7 so that the sulfur dioxide contained therein is oxidized. Part of the sulfuric acid formed in the oxidizing column 2 is returned to the absorbing column 1, while the remaining portion of sulfuric acid is delivered through a pipe 11 to a crystallizing tank 20 which is provided with an agitating means. The aqueous solution of sulfuric acid which has been introduced into the crystallizing tank reacts with a calcium-containing alkali liquid being delivered therein via a pipe 21. The reaction produces gypsum. As the agitating means, there may be employed a mechanical stirrer. Otherwise, the required turbulent flow of the mixture may be produced by causing air or oxygen meant for delivery to the sulfur dioxide oxidizing column 2 or air for some other purpose to be blown into the crystallizing tank 11 via its bottom. The slurry which contains the crystals of gypsum formed in the crystallizing tank is withdrawn by a pump 22 and then forwarded to a solid-liquid separator 23, wherein it is separated into crystals and mother liquor. The crystals may, as required, be washed with water to afford gypsum of good quality in the form of calcium sulfate bihydrate and then discharged through an outlet 27 of the separator 23. The waste water which results from the washing of crystals and the mother liquid which contains the oxidizing catalyst and which results from the removal of crystals are both sent to a mother liquid tank 24 and then circulated via a pipe 26 to the absorbing column 1 by means of a pump 25. The mother liquor resulting from the removal of crystals is not always required to be returned to the absorbing column. It may be returned to the oxidizing column 2 or to some other suitable process.

The present embodiment amounts to addition of a gypsum production process to the device illustrated in FIG. 1. It goes without saying that the gypsum production process described above may be incorporated into the device illustrated in FIG. 4 or that illustrated in FIG. 5.

Figure 7:
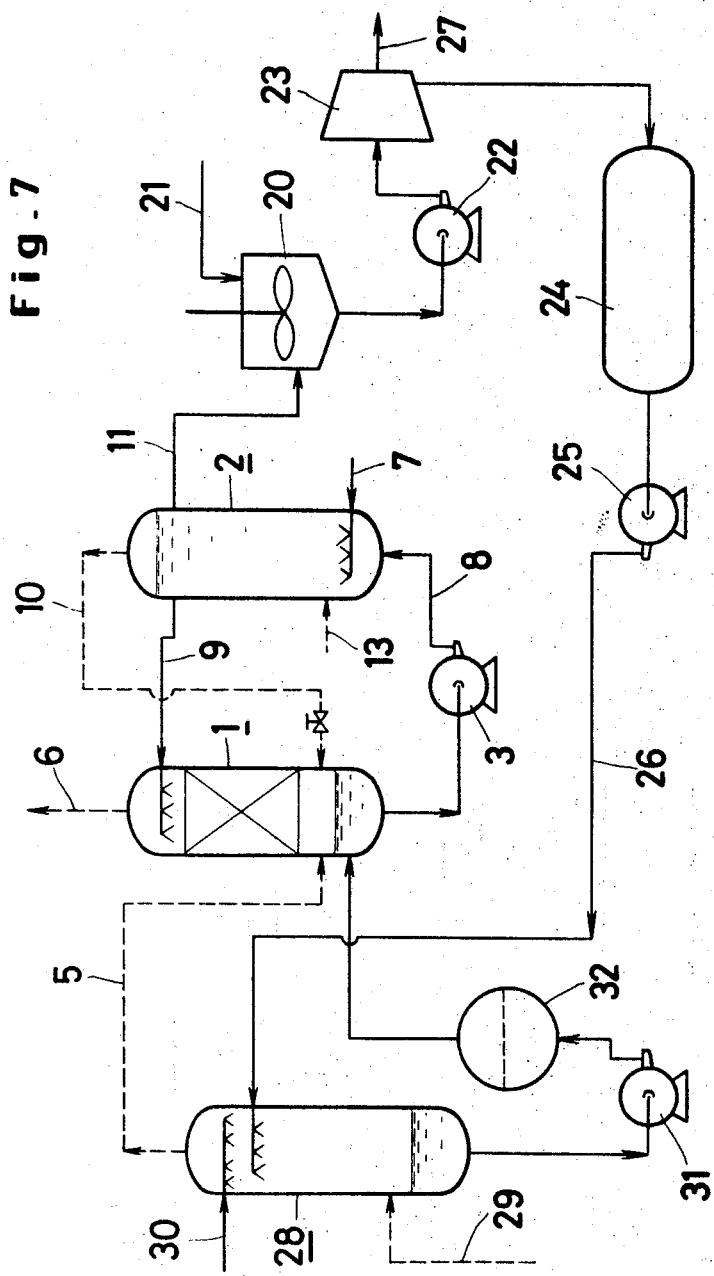

FIG. 7 is a flow sheet illustrating a device formed by incorporating into the device of FIG. 6 a pretreatment process designed for the removal, by washing, of soot and dust so as to permit a unified operation of flue gas treatment.

The flue gas from the boiler usually has a temperature in the range of from 130° C. to 170° C. It is introduced via a pipe 29 to the soot scrubber 28, wherein it is washed with the mother liquid injected downwardly from the top of the scrubber. The soot and dust contained in the gas are consequently removed by the liquid. At this time, water is vaporized until the waste gas being introduced is saturated substantially completely with water. The gas discharged through the scrubber 28 is colled to 40–70° C. A pipe 30 provided for the scrubber 28 is intended to supply water to make up for the water which has been vaporized upon contact with the gas. At the bottom of this scrubber 28 there is collected the aqueous solution which now contains such solid matters as soot and ashes, partially dissolved sulfur dioxide, heavy metals, unburnt organic compounds and so on in consequence of contact with the flue gas. This aqueous solution is forwarded by a pump 21 to a filter 32 so as to be deprived of solid matters. Thereafter, the aqueous solution is sent to the sulfur dioxide absorbing column 1. This aqueous solution may be sent directly to the sulfur dioxide oxidizing column 2 without being passed through the absorbing column 1. The solid matters which have been separated by the filter 32 are withdrawn out of the system and disposed of by a suitable means. The removed solid matters may be admixed into the by-produced gypsum when the solid matters occur only in a small amount or when the usage of the by-produced gypsum is not affected by the presence of such extraneous matters. Instead of utilizing the filter 32, the wash liquid of the scrubber 28 may be delivered by a pump 31 to the absorbing column 1, the oxidizing column 2 or a crystallizing tank 20 so as to have the solid matters admixed eventually into the gypsum. The gas which has been freed of solid matters is fed via a pipe 5 to the bottom of the sulfur dioxide absorbing column 1, wherein it is brought into counter-current contact with the aqueous solution of sulfuric acid in the same manner as in the absorbing column of FIG. 6, so that the sulfur dioxide present in the gas is absorbed. Sulfurous acid which has absorbed sulfur dioxide in the absorbing column 1 is oxidized in the oxidizing column 2 to form the aqueous solution of sulfuric acid. Part of this aqueous solution of sulfuric acid is returned to the absorbing column 1 and is used therein as the absorbent liquid. The remaining portion of the aqueous solution is sent to the crystallizing tank 20, wherein it is allowed to react with a calcium-containing alkali solution to form a slurry containing crystals of gypsum. The slurry is separated by a solid-liquid separator into the crystals of gypsum and the mother liquid. The mother liquid is returned by a pump 25 to the soot-dust scrubber 28 and is used therein as the wash liquid. Even if such pretreatment process is incorporated, this invention can provide effective treatment of the gas without permitting the waste water from the treatment of gas to be discharged out of the system.

By incorporating such gypsum production process, the gas treating method of the present invention can provide desired removal of sulfur dioxide from the gas without permitting any of the waste water from the treatment to be discharged out of the system. At the same time, it affords preparation of an entirely harmless gypsum as a by-product.

A perfect solution to the problem of environmental pollution caused by the gas resides is thus provided by decreasing the absolute amount of sulfur dioxide discharged. The method of the present invention can remove sulfur dioxide by nearly 100% and permit perfect removal of soot and dust which are entrained by the flue gas. From the standpoint of prevention of public nuisance, this is an outstanding method.

Working examples of the present invention are described below. This invention should not be construed as being limited in any way to these examples.

Example 1

A gas composed of 0.3% by volume of $SO_2$, 2% by volume of $O_2$ and the balance of $N_2$ and having a temperature of 56° C. was delivered at a flow rate of 40 Nm.³/hr. to a packed column (200 mm. in diameter and 3,000 mm. in height) filled with Raschig rings 5 mm. in diameter. Through the top of the packed column, 5(weight)% dilute sulfuric acid containing 200 p.p.m. of $Mn^{++}$ was fed via an oxidizing column at a rate of 1,000 lit./hr. The said gas was brought into contact with the dilute sulfuric acid within the packed column, with a result that the sulfur dioxide present in the gas was absorbed by the dilute sulfuric acid and the purified gas was discharged via the top of the packed column. By virtue of a pump, the liquid which had absorbed sulfur dioxide was continuously extracted through the bottom of the packed column and forwarded at a rate of 1,000 lit./hr. to an oxidizing column which measured 200 mm. in diameter and 6,000 mm. in height and which was provided at the lower portion with a dispersing board for air introduction. As air was blown in at a rate of 1.44 Nm.$^3$/hr., the dispersing board enabled the aid to ascend in the form of fine bubbles in the oxidizing column. As the catalyst, the solution of $Mn^{++}$ was fed intermittently into the oxidizing column so that the catalyst concentration would be kept above 100 p.p.m. as $Mn^{++}$.

When the dilute sulfuric acid forwarded from the packed column came into contact with oxygen in the oxidizing column, the sulfur dioxide contained in the acid was oxidized so that the concentration of sulfuric acid increased at a rate of 0.298% by weight per hour. By starting continuous withdrawal of sulfuric acid through the top of the oxidizing column at a rate of 4.2 lit./hr. after lapse of 10 hours, the sulfuric acid concentration in the system could be maintained at about 8% by weight. The liquid circulated in the system remained in the range of from 47 to 53° C.

The gas discharged via the top of the oxidizing column was returned to the bottom of the packed column so as to cause absorption of the sulfur dioxide present in the discharged gas. As a consequence, the gas discharged through the top of the packed column had a sulfur dioxide concentration of from 0.006 to 0.004% by volume.

Example 2

A gas having a higher oxygen content than the gas of Example 1 was treated by using the same absorbing column and oxidizing column as those of Example 1.

First, 5(weight)% sulfuric acid solution having a temperature of 50° C. and containing 400 p.p.m. of $Mn^{++}$ was circulated between the packed column and the oxidizing column at a rate of 812 lit./hr. In the meantime, air was blown at a flow rate of 0.84 Nm.$^3$/hr. into the oxidizing column through the dispersing board disposed at the lower portion of the column.

A gas 60° C. of temperature composed of 0.240% by volume of $SO_2$, 20.3% by volume of $O_2$ and the balance of $N_2$ was delivered at a flow rate of 30.2 Nm.$^3$/hr. into the packed column via the bottom. By analysis, the gas discharged through the top of the packed column was found to have sulfur dioxide concentration of 60 to 200 p.p.m. by volume.

When the formed sulfuric acid was extracted at a flow rate of 3.7 lit./hr. through the top of the oxidizing column, the concentration of sulfuric acid in the circulated liquid was maintained at a level of about 5.6% by weight. The concentration of the catalyst was maintained in the range of 200 to 400 p.p.m. as $Mn^{++}$ by intermittently feeding $MnSO_4$ sulfuric acid solution.

The liquid coming out of the packed column was sampled at the outlet of the pump and analyzed. The sulfur dioxide concentration in this liquid was found to be 0.021% by weight. In the case of the liquid overflowing the top of the oxidizing column, the sulfur dioxide concentration was found to be 0.0004% by weight. Sulfur dioxide was absorbed substantially completely by the absorbing column. At the bottom of the packed column, however, there was found no sign suggesting that the oxidation of sulfur dioxide had proceeded up to $SO_3$.

Example 3

Flue gas discharged from a boiler was treated by using the same device as used in Example 1.

With the aid of the pump, the 5(weight)% aqueous solution of sulfuric acid having a temperature of 50° C. and containing 200 p.p.m. of $Mn^{++}$ was circulated at a flow rate of 980 lit./hr. between the packed column and the oxidizing column. In the meantime, air was blown at a flow rate of 1.32 Nm.$^3$/hr. into the oxidizing column through the bottom.

Then, the smoke from the boiler which was composed of 9.9% by volume of $H_2O$, 12.2% by volume of $CO_2$, 2.7% by volume of $O_2$, 74.9% by volume of $N_2$ and 0.13% by volume of $SO_2$ was cooled to 159° C. and immediately fed at a flow rate of 32.2 Nm.$^3$/hr. into the packed column through the bottom. The gas discharged from the top of the absorbing column had an outlet temperature of 57° C. and sulfur dioxide concentration in the range of from 80 to 240 p.p.m.

The sulfuric acid concentration was maintained at a level of about 5.9% by weight by drawing off the formed sulfuric acid at a rate of 4.6 lit./hr. To make up for the water lost by the vaporization inside the packed column, water was fed at a flow rate of 2.6 lit./hr. with the liquid level kept constant inside the packed column.

The operation mentioned above was carried out continuously for 57 hours. After this period, the sulfur dioxide concentration in the gas which was discharged from the top of the packed column increased gradually and, within 4 hours, reached 900 p.p.m. At this point, there appeared a degradation of oxidation. In the 64th hour of operation, the flow rate of air being blown into the oxidizing column was increased to 5 Nm.$^3$/hr. and kept at this level temporarily for about 4 hours. As a consequence, the sulfur dioxide concentration in the gas coming out of the packed column fell to 90 p.p.m. Thereafter, the sulfur dioxide concentration at the outlet remained in the range of from 80 to 130 p.p.m. even when the flow rate of air was lowered to 1.5 Nm.$^3$/hr.

Example 4

The gas discharged from a sulfur recovery plant was sent through a device like the one shown in FIG. 4, using $Fe^{+++}$ as the catalyst, to effect removal of sulfur dioxide from the gas.

The absorbing-oxidizing column measured 800 mm. in diameter and 13,000 mm. in overall length. The absorbing compartment formed in the upper portion of this column was filled with Raschig rings up to a height of 5,000 mm. The oxidizing compartment formed in the lower portion of the device was practically empty, except 10 sieve plates were disposed equidistantly so as to prevent back mixing of liquid.

The gas was composed of 1.2% of $SO_2$, 3.8% of $CO_2$, 1.6% of $O_2$, and 3.9% of $H_2O$ (by volume) and the balance of $N_2$. It was introduced at a flow rate of 1,000 Nm.$^3$/hr. at 170° C. under normal pressure. In the meantime, the liquid was withdrawn at a rate of 30 Nm.$^3$/hr. via the bottom of the device by means of a pump. The withdrawn liquid was introduced into the absorbing compartment via the top and used therein as the absorbent liquid. The air was blown in at a flow rate of 80 Nm.$^3$/hr. through the gas dispersing board disposed at the lower portion of the device, so as to permit the sulfur dioxide solution descending from the absorbing compartment to be oxidized by $O_2$ present in the air. The sulfur dioxide concentration in the gas discharged through the top of the device was maintained in the range of from 50 to 100 p.p.m. The formed sulfuric acid was withdrawn at a rate of 0.86 Nm.$^3$/hr. and water was fed continuously into the device so that the liquid level therein could be maintained constant. The sulfuric acid concentration of the liquid was about 5.8 to 6.2% by weight.

The $Fe^{+++}$ in the catalyst was adjusted by dissolving $Fe_2(SO_4)_3$ in water. It was intermittently fed so that the catalyst concentration within the device could be maintained in the range of from 300 to 500 p.p.m. as $Fe^{+++}$. The temperature of the gas was lowered to about 49° C. as a result of the vaporization of steam into the gas. The temperature of the circulated liquid was 46° C.

Example 5

The smoke discharged from a boiler using asphalt as the fuel and composed of 0.3% of $SO_2$, 9.9% of $H_2O$, 12.2% of $CO_2$, 2.7% of $O_2$, 74.9% of $N_2$ (by volume)

and a trace of impurities was fed at a rate of 13 to 17 Nm.³/hr. to a scrubber, wherein the impurities were washed down to the bottom of the scrubber. The gas thus scrubbed was then sent to a packed type sulfur dioxide absorbing column 200 mm. in diameter, wherein it was brought into contact with the aqueous solution of sulfuric acid having a temperature of about 52° C. and containing 5000 p.p.m. of $Fe^{+++}$ so as to have sulfur dioxide removed by absorption. Thus, the sulfur dioxide concentration in the waste gas was lowered to 50 p.p.m. Then, the aqueous solution of sulfuric acid containing sulfur dioxide was forwarded from the bottom of the absorbing column to the bubble type oxidizing column 200 mm. in diameter, wherein it came into contact with air being blown in at about 53° C. so as to cause thorough oxidation of dissolved sulfur dioxide. The liquid from the top of the oxidizing column was used as the absorbent liquid. At a sign of rise in the sulfuric acid concentration, the liquid was withdrawn intermittently so as to permit the sulfuric acid concentration in the liquid being treated to remain in the range of 6 to 8% by weight.

FIG. 8 graphically indicates the transition of operation of this working example as recorded along the course of time. The upper graph shows the time-course change of the percentage of sulfur dioxide oxidation and the lower graph that of sulfuric acid concentration in the oxidizing column.

After lapse of 4 hours and 90 hours respectively (point D in FIG. 8), 40 liters each of the wash liquid which had been used in the scrubber in the pretreatment before absorption and consequently collected impurities from the gas was taken and added to the absorbent liquid inside the absorbing column to investigate how the impurities would poison the catalyst contained in the liquid. Poisoning of catalyst, if induced at all by the impurities, would naturally be manifested as a serious decline in the percentage of oxidation of sulfur dioxide. The graph clearly suggests, however, that the catalyst was not poisoned at all. For the same purpose, 20 liters of the mother liquid resulting from the removal of gypsum which was produced by adding limestone to the withdrawn sulfuric acid, was taken after lapse of 72 hours of operation (point E in FIG. 8) and added to the absorbent liquid. However, there was found no sign of catalyst poisoning ascribable to the action of impurities originating in the limestone.

The adjustment of sulfuric acid concentration as indicated in the upper graph (point F in FIG. 8) means an operation which consisted of withdrawing the aqueous solution of sulfuric acid from the oxidizing column and adding plain water to the oxidizing column by way of replacement each time the sulfuric acid concentration in the oxidizing column rose to approach 8%. The lower graph clearly indicates that the sulfuric acid concentration was lowered each time adjustment was made in the sulfuric acid concentration.

The data of FIG. 8, therefore, support the conclusion that the catalyst remains unpoisoned and the oxidation of sulfur dioxide is continued stably for a long time even if impurities have a possibility of finding their way into the liquid being circulated in the system.

Example 6

Smoke at 159° C. discharged from a boiler using asphalt as the fuel and composed of 0.3% of $SO_2$, 9.9% of $H_2O$, 12.2% of $CO_2$, 2.7% of $O_2$, 74.9% of $N_2$ (by volume) and 1.8 g./Nm.³ of soot and dust was treated in a device like the one shown in FIG. 7. The smoke was initially fed at a flow rate of 1,000 Nm.³/hr. to a soot scrubber. In the scrubber, it was scrubbed with the aqueous solution being injected at a rate of 300 lit./hr. from the mother liquid tank, so that the gas was freed of solid matters entrained thereby. The discharged gas, cooled to about 64° C., was sent to the packed type sulfur dioxide absorbing column 700 mm. in diameter, wherein it came into contact with the aqueous solution of sulfuric acid supplied at a rate of 50 m.³/hr. from the oxidizing column. Thereafter, the gas was released into the atmospheric air. The gas thus discharged out of the system was found to have a sulfur dioxide concentration ranging from 80 to 140 p.p.m.

The absorbent liquid and the liquid which had been used in the scrubber were forwarded at respective rates of about 50,000 lit./hr. and about 230 lit./hr. to the oxidizing column, wherein they were brought into intimate contact with air being fed in at a flow rate of 50 Nm.³/hr., causing the oxidation of sulfur dioxide. The liquid in this case contained about 2,500 p.p.m. of $Fe^{+++}$ and 100 p.p.m. of $Mn^{++}$ as the catalyst. The formed aqueous solution of sulfuric acid was forwarded at a rate of 230 lit./hr. from the oxidizing column to the crystallizing tank and brought into contact with limestone fed at a rate of 12.7 kg./hr. to produce gypsum. The resultant slurry was sent to the centrifugal separator and divided thereby into gypsum crystals and mother liquid. The mother liquid was returned to the soot scrubber. This separation produced gypsum crystals at a rate of about 20.4 kg./hr. It was found to be suitable for the production of gypsum board.

Example 7

Smoke at 159° C. discharged from a boiler using heavy oil as the fuel and composed of 0.1% of $SO_2$, 10.1% of $H_2O$, 12.2% of $CO_2$, 2.7% of $O_2$, 74.9% of $N_2$ (by volume) and 0.2 g./Nm.³ of soot and dust was initially fed at a flow rate of 1,000 Nm.³/hr. to a soot scrubber as shown in FIG. 7. In the scrubber, the smoke was scrubbed with the aqueous solution being injected at a rate of 100 lit./hr. from the mother liquid tank, so that the gas was freed of solid matters entrained thereby. The discharged gas cooled to about 64° C. was sent to the packed type sulfur dioxide absorbing column 700 mm. in diameter, wherein it came into contact with the aqueous solution of sulfuric acid supplied at a rate of 50 m.³/hr. from the oxidizing column. Thereafter, the gas was released into the atmospheric air. The gas thus discharged out of the system was found to have a sulfur dioxide concentration ranging from 20 to 50 p.p.m.

The absorbent liquid and the liquid which had been used in the scrubber were forwarded at respective rates of about 50,000 lit./hr. and about 80 lit./hr. to the oxidizing column, wherein they were brought into intimate contact with air being fed in at a flow rate of 30 Nm.³/hr., causing the oxidation of sulfur dioxide. The liquid in this case contained about 3,000 p.p.m. of $Fe^{+++}$ as the catalyst. The formed aqueous solution of sulfuric acid was forwarded at a rate of 80 lit./hr. from the oxidizing column to the crystallizing tank and was brought into contact with limestone fed at a rate of 4.2 kg./hr. to produce gypsum. The resultant slurry was sent to the centrifugal separator and divided thereby into gypsum crystals and mother liquid. The mother liquid was returned to the soot scrubber. This separation produced gypsum crystals at a rate of about 7.4 kg./hr. It was found to be suitable for producing portland cement retarder.

Example 8

Flue gas at 220° C. composed of 1.2% of $SO_2$, 9.9% of $H_2O$, 12.2% of $CO_2$, 2.7% of $O_2$, 74.0% of $N_2$ (by volume) and 0.2 g./Nm.³ of soot and dust was initially fed at a flow rate of 1,000 Nm.³/hr. to a soot scrubber as shown in FIG. 7. In the scrubber, the smoke was scrubbed with the aqueous solution being injected at a rate of 1200 lit./hr. from the mother liquid tank, so that the gas, was freed of solid matters entrained thereby. The discharged gas cooled to about 65° C., was sent to the packed type sulfur dioxide absorbing column 700 mm. in diameter, wherein it came into contact with the aqueous solution of sulfuric acid supplied at a rate of 50 m.³/hr. from the oxidizing column. Thereafter, the gas was released into the atmospheric air. The gas thus discharged out of the system was found to have a sulfur dioxide concentration ranging from 200 to 300 p.p.m.

The absorbent liquid and the liquid which had been used in the scrubber were forwarded at respective rates of about 50,000 lit./hr. and about 920 lit./hr. to the oxidizing column, wherein they were brought into intimate contact with air being fed in at a flow rate of 150 Nm.³/hr., causing the oxidation of sulfur dioxide. The liquid in this case contained about 3,000 p.p.m. of $Fe^{+++}$ as the catalyst. The formed aqueous solution of sulfuric acid was forwarded at a rate of 920 lit./hr. from the oxidizing column to the crystallizing tank and brought into contact with limestone fed at a rate of 50.8 kg./hr. to produce gypsum. The resultant slurry was sent to the centrifugal separator and divided thereby into gypsum crystals and mother liquid. The mother liquid was returned to the soot-dust scrubber. This separation produced gypsum crystals at a rate of about 81.5 kg./hr.

The gypsum obtained comprised 5.3% free water and a 10% suspension thereof in water had a pH of 6.5. As a result of chemical analysis, the gypsum was found to comprise 97.5% $CaSO_4$, $2H_2O$ at dry base, with the balance being as shown below in Table 1.

TABLE 1

| | Percent by weight |
|---|---|
| Combined water | 20.5 |
| $SiO_2$+insoluble residues | 0.6 |
| $A_2O_3$+$Fe_2O_3$ | 0.08 |
| CaO | 31.8 |
| $SO_3$ | 45.3 |
| MgO | 0.0 |

Physical test found this gypsum suitable particularly for the production of gypsum board, plaster and portland cement retarder.

What is claimed is:

1. A method for the treatment of waste gas containing sulfur dioxide, which method comprises:
    (A) bringing said waste gas into counterflow contact in a first zone with dilute sulfuric acid aqueous solution containing dissolved oxygen, the dilute sulfuric acid aqueous solution having a temperature in the range of from about 40° C. to 95° C., and causing said solution to absorb sulfur dioxide from the waste gas;
    (B) converting absorbed sulfur dioxide to sulfur trioxide in the first zone in the presence of a catalyst to produce sulfuric acid, said catalyst selected from the group consisting of $Fe^{+++}$ and combined $Fe^{+++}$ and $Mn^{++}$;
    (C) passing aqueous solution comprising sulfurous acid, sulfuric acid, $Fe^{+++}$ and $Fe^{++}$ from the first zone to a second zone;
    (D) introducing oxygen or oxygen containing gas into the second zone;
    (E) oxidizing sulfurous acid to sulfuric acid in said aqueous solution from Step (C) in said second zone, said second zone containing said catalyst present in an amount from 0.08% to 0.6% by weight;
    (F) regenerating catalyst by oxidizing $Fe^{++}$ to $Fe^{+++}$ in the second zone;
    (G) passing dilute sulfuric acid aqueous solution containing dissolved oxygen from the second zone into counterflow contact in the first zone;
    (H) removing sulfuric acid aqueous solution from the second zone, and
    (I) supplying make-up water and make-up catalyst.

2. The method of Claim 1 wherein a portion of the dilute sulfuric acid aqueous solution from the second zone is reacted with $Ca^{++}$ and thereafter recovering gypsum from the reaction solution.

3. The method of Claim 2 wherein said $Ca^{++}$ is from limestone.

4. The method of Claim 2 wherein mother liquid resulting after recovery of gypsum is returned to the dilute sulfuric acid aqueous solution for use in the first zone.

5. The method of Claim 1 wherein the temperature is 50 to 70° C., the catalyst is $Fe^{+++}$, and the amount of catalyst is 0.1 to 0.25% by weight.

6. The method of Claim 1 wherein the catalyst is combined $Fe^{+++}$ and $Mn^{++}$ in a minimum amount of 1200 p.p.m. and 60 p.p.m. by weight respectively, and the temperature is from 30 to 80° C.

7. The method of Claim 1 wherein the oxygen containing gas is air which is introduced into the second zone in two to five times the amount of theoretical requirement.

References Cited

UNITED STATES PATENTS

| 2,021,936 | 11/1935 | Johnstone | 423—242 |
| 2,342,704 | 2/1944 | Striplin | 423—529 |

OSCAR R. VERTIZ, Primary Examiner

G. A. HELLER, Assistant Examiner

U.S. Cl. X.R.

423—166, 522